May 12, 1953  R. M. REDHEFFER  2,638,268
COMPUTER FOR EVALUATING COMPLEX INTEGRALS
Filed April 5, 1946  2 Sheets-Sheet 1

FIG. I

INVENTOR
RAYMOND M. REDHEFFER
BY *M. A. Hayes*
ATTORNEY

May 12, 1953 — R. M. REDHEFFER — 2,638,268
COMPUTER FOR EVALUATING COMPLEX INTEGRALS

Filed April 5, 1946 — 2 Sheets-Sheet 2

INVENTOR
RAYMOND M. REDHEFFER
BY
ATTORNEY

Patented May 12, 1953

2,638,268

UNITED STATES PATENT OFFICE 2,638,268

COMPUTER FOR EVALUATING COMPLEX INTEGRALS

Raymond M. Redheffer, Cambridge, Mass., assignor, by mesne assignments, to the United States of America as represented by the Secretary of the Navy Application April 5, 1946, Serial No. 659,711

4 Claims. (Cl. 235—61)

This invention relates in general to computing machines and in particular to machines for evaluating summations and integrals containing one or more parameters.

This invention is applicable in general for evaluating the summation of the products of two series of terms and in particular for evaluating the convolution, the Laplace, and other integrals with variable limits and with additional parameters.

The primary object of this invention is to provide apparatus for evaluating the summation of the products of two series of terms.

A further object of this invention is to provide apparatus for evaluating the convolution, the Laplace, and other integrals with variable limits and with additional parameters.

Other and further objects of this invention will be apparent from the following specification when taken with the accompanying drawings in which.

Figure 1:
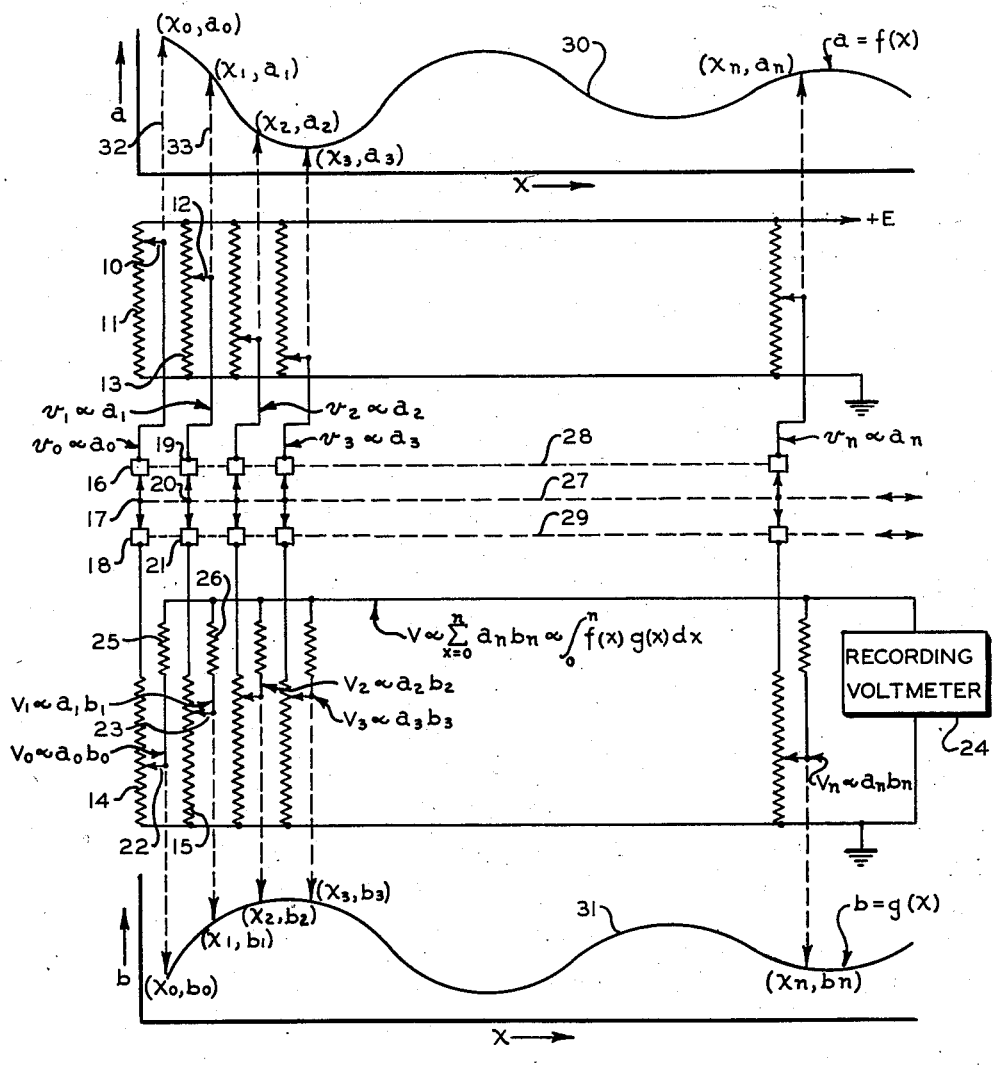
Fig. 1 is a schematic diagram of an embodiment of this invention.

Referring to the schematic diagram of the computer circuit, Fig. 1, all of the potentiometers shown are so constructed that the voltage at the sliding contact of each potentiometer is directly proportional to the distance from that contact to one end of the potentiometer. This linear voltage relationship is maintained despite the loading on each potentiometer by another potentiometer or resistor, by properly proportioning the resistance values of the potentiometers. Thus the voltage $v_0$ on arm 10 of potentiometer 11 is a proportional part of the supply voltage E and is proportional to the setting $a_0$ of arm 10 where $a_0$ is the distance from arm 10 to one end of potentiometer 11. Similarly the voltage $v_1$ on arm 12 of potentiometer 13 is proportional to the setting $a_1$ of arm 12. These voltages are applied across potentiometers 14 and 15 respectively through switch contacts 16, 17, and 18 and 19, 20, and 21 which will be described more fully later. The setting of arm 22 on potentiometer 14 is proportional to $b_0$ where $b_0$ is the distance from arm 22 to one end of potentiometer 14, but the supply voltage for potentiometer 14 is proportional to $a_0$, therefore the voltage $V_0$ on arm 22 is proportional to the product $a_0 b_0$. Similarly the voltage $V_1$ on arm 23 of potentiometer 15 is proportional to the product $a_1 b_1$. These voltages, $V_0$ and $V_1$ are connected to voltmeter 24 through equal value isolating resistors 25 and 26 and therefore the voltage $V$ recorded on voltmeter 24 is proportional to the sum of the products $a_0 b_0$ and $a_1 b_1$; that is $V \alpha a_0 b_0 + a_1 b_1$. It is apparent that as more voltages are obtained from additional potentiometers connected as described, voltmeter 24 will record the sum of the products of all the terms introduced; that is, $$V \alpha \sum (a_0 b_0 + a_1 b_1 + a_2 b_2 + \ldots + a_n b_n)$$

or as more commonly expressed, $$V \alpha \sum_0^n a_n b_n$$

where $n$ is the number of terms summed. The values of the fixed resistors (25, 26, etc.) are all equal so that the terms in the summation are equally weighted. Other weighting could be accomplished by fixed other relationships between the values of these fixed resistors.

To evaluate an integral such as $$\int_0^n f(x)g(x)dx$$

between the limits $o$ and $n$, it is first necessary to plot curves representing the functions $f(x)$ and $g(x)$ to the proper scale as determined by the physical dimensions of the computing machine. These curves are placed in position in the computing machine and pointers connected to the contact arms of the potentiometers are placed at points along the two curves. This is shown schematically in Fig. 1 with curve 30 representing the function $a = f(x)$ and curve 31 representing the function $b = g(x)$, both curves being shown plotted about their respective axes and in position schematically with respect to the potentiometers. Pointers mechanically connected to the contact arms of the potentiometers are shown schematically as arms 32, 33, etc., and these pointers displace the contact arms a distance equal to the plotted ordinates of the curves, the ordinates of the curve $a = f(x)$ being represented by the symbols $a_0$, $a_1$, $a_2$, etc., and the ordinates of the curve $b = g(x)$ being represented by the symbols $b_0$, $b_1$, $b_2$, etc. The contacts 17, 20, etc., of the center section 27 of the switching mechanism are closed in succession, starting with contact 17 to the $n$th contact, and the voltage recorded on voltmeter 24 is the value of the sum, or integral, for $n$ terms. The closer together the points are taken on the curves, the more accurate will be the evaluation. In practice the accuracy of the evaluation of the integral can be increased by shifting the curves a fraction of the distance between potentiometers, reevaluating the integral a number of times, and averaging the results of the evaluations.

Figure 2:
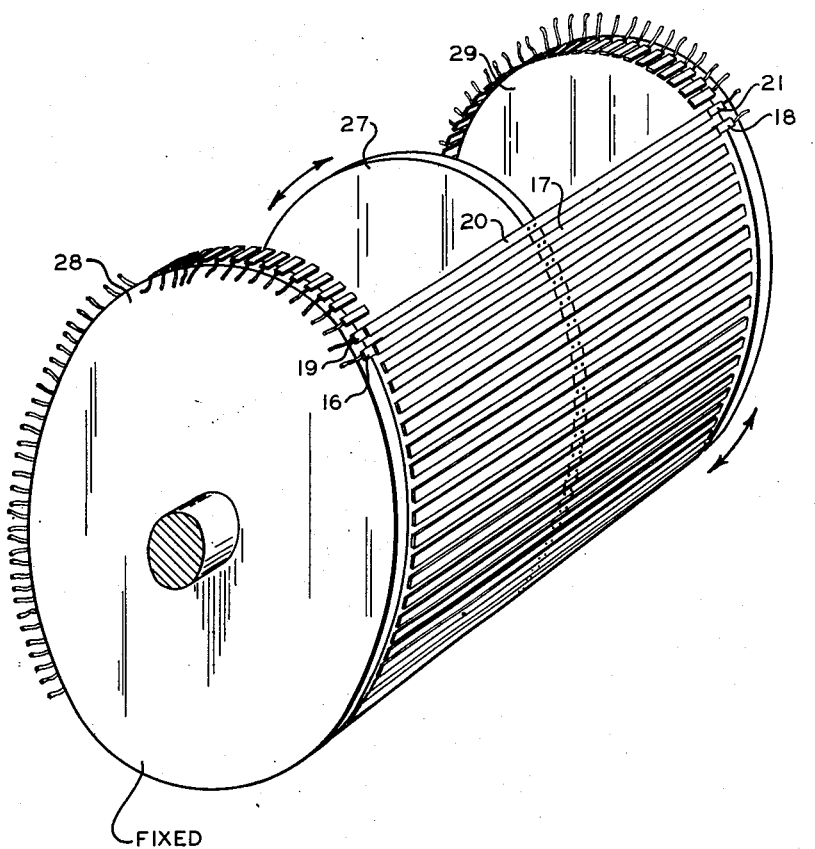
Fig. 2 is an isometric view of a part of the invention.

One form of the switching mechanism previously mentioned is shown in Fig. 2. Essentially the switch is composed of three sets of contacts mounted on discs, one of which is fixed while the other two are rotatable. In Fig. 2 these discs are discs 27, 28 and 29. (For clarity, the reference numbers used in Fig. 2 correspond to those used in the schematic representation of the switch in Fig. 1.) The stationary disc 28 has contacts 16, 19 etc. fastened around its circumference, which contacts are connected to the arms of the first series of potentiometers (11, 13, etc. of Fig. 1). A similar set of contacts are positioned around the circumference of disc 29 and are connected to the second series of potentiometers (14, 15, etc. of Fig. 1). The center disc 27 has the connecting contactors (17, 20 etc.) fastened around its circumference. These latter contactors are not connected to any external circuit but are used only to make connection between opposite contacts on the other two discs. On all three discs the contacts only extend around one-half of the circumference so that disc 27 may be rotated to a position where all the circuits are open.

When the two outside discs, 28 and 29, are properly positioned, the number of contacts made by the center disc, 27, determines $n$, the limit of the integral being evaluated. Thus $n$ may be any whole number between zero and the total number of switch elements, which number depends only upon the physical limitations in the size of the machine.

To evaluate the convolution, the form of which is given by the integral $$\int_0^n f(x)g(x-t)dx$$

disc 29 of the switch is made rotatable with respect to disc 28. This has the effect of multiplying $a_0$ by $b_{0-t}$, etc. to $a_n$ by $b_{n-t}$. It is apparent that $t$ can be any number from zero to the number of contacts on the switch. The voltmeter 24 will now record a voltage V proportional to $$\sum_0^n a_n b_{n-t}$$

and it is seen that the parameters $n$ and $t$ may be varied independently or together, as necessary for the particular problem, by rotating the correct discs of the switch.

By plotting the curves $f(x)$ and $g(x-t)$ on semi-logarithmic paper, the integral $$\int_0^n f(x)g(x-t)dx$$

of which the Laplace integral is a special case, can be evaluated as functions of the parameters $n$ and $t$.

It is readily apparent that the integral $$\int_0^n f(x)dx$$

may be evaluated by making the function $g(x)=1$. Summations of the products of more than two terms, i. e., $$\sum_0^n a_n b_n c_n \cdots k_n$$

can be evaluated by adding an additional set of potentiometers for each additional term in the product.

This invention is not to be limited to the details of this specification but is to be limited only by the following claims.

What is claimed is:

1. A computer for evaluating the summation of the products of two functions represented by curves comprising, a voltage source, a first series of linear potentiometers energized from said source, the movable taps of successive potentiometers of said series being displaceable to provide a series of voltages representing successive ordinates of the first of said curves, a second series of potentiometers having movable taps of successive potentiometers displaceable to represent successive ordinates of the second of said curves, equal value isolating resistors for connecting together the movable taps of said second series of potentiometers into a summing network to produce a resultant voltage proportional to the sum of the voltages on said movable taps, means for indicating the amplitude of said resultant voltage, and a switch mechanism for sequentially energizing a predetermined number of successive additional potentiometers of said second series from said movable taps of predetermined corresponding successive potentiometers of said first series whereby selective variable limits for the summation are provided.

2. A computer for evaluating the summation of the products of two functions represented by curves comprising, a voltage source, a first series of linear potentiometers energized from said source, the movable taps of successive potentiometers of said series being displaceable to provide a series of voltages representing successive ordinates of the first of said curves, a second series of potentiometers having movable taps of successive potentiometers displaceable to represent successive ordinates of the second of said curves, equal value isolating resistors for connecting together the movable taps of said second series of potentiometers into a summing network to produce a resultant voltage proportional to the sum of the voltages on said movable taps, means for indicating the amplitude of said resultant voltage, and a switch mechanism for sequentially energizing a predetermined number of successive additional potentiometers of said second series from said movable taps of predetermined corresponding successive potentiometers of said first series, said switch mechanism being adjustable to select the correspondence between potentiometers of said second series with potentiometers of said first series.

3. A computer for evaluating the summation of the product of two series of terms comprising, a voltage source, a first series of potentiometers energized from said source, the movable taps of successive potentiometers being displaceable to provide a series of output voltages representing successive terms of the first of said series of terms, a second series of potentiometers, switching means for sequentially connecting successive additional potentiometers of said second series to predetermined corresponding successive potentiometers of said first series at the movable taps thereof, the movable taps of successive potentiometers of said second series being displaceable in accordance with successive terms of the second of said series of terms to produce at the movable taps of said second series of potentiometers a series of output voltages representing products of corresponding terms in sequence of said two series of terms, a plurality of equal value isolating resistors for connecting together the movable taps of said second series of potentiometers into a summing network to produce a resultant voltage proportional to the sum of said series of output voltages, and means for recording the successive resultant voltages produced as successive additional potentiometers of said second series are energized in sequence from said corresponding potentiometers of said first series to evaluate the integral between selected variable limits determined by said switching means.

4. The apparatus of claim 3 in which said switching mechanism comprises, first, second and third rotatable drums said first and second drums having a plurality of spaced contacts mounted on one-half of the periphery thereof, successive contacts of said first drum being electrically connected to the movable taps of successive potentiometers of said first series, successive contacts of said second drum being electrically connected to the resistance element of successive potentiometers of said second series, said first and second drums being movable with respect to each other and said third drum to select the potentiometer of said second series to be connected to a predetermined potentiometer of said first series, said third drum being mounted coaxially with said first and second drums and having a plurality of contacts mounted on the periphery thereof and adaptable to be positioned by rotation of said third drum with respect to said first and second drums to connect in sequence said selected potentiometers of said second drum to said corresponding predetermined potentiometers of said first series.

RAYMOND M. REDHEFFER.

References Cited in the file of this patent

UNITED STATES PATENTS

| Number    | Name     | Date          |
|-----------|----------|---------------|
| 2,258,859 | Mitelman | Oct. 14, 1941 |
| 2,417,098 | Wilcox   | Mar. 11, 1947 |